Oct. 27, 1925.

H. E. STURTEVANT 1,558,719

CHAIN AND PARTS THEREFOR

Filed Nov. 15, 1923

2 Sheets-Sheet 1

INVENTOR.
Harold E. Sturtevant
BY Gifford, Bull & Bull
his ATTORNEYS.

Oct. 27, 1925. 1,558,719
H. E. STURTEVANT
CHAIN AND PARTS THEREFOR
Filed Nov. 15, 1923 2 Sheets-Sheet 2

INVENTOR.
Harold E. Sturtevant
BY Gifford, Bull, Scull
his ATTORNEYS.

Patented Oct. 27, 1925.

1,558,719

UNITED STATES PATENT OFFICE.

HAROLD E. STURTEVANT, OF HARTFORD, CONNECTICUT, ASSIGNOR TO THE WHITNEY MFG. CO., OF HARTFORD, CONNECTICUT, A CORPORATION OF CONNECTICUT.

CHAIN AND PARTS THEREFOR.

Application filed November 15, 1923. Serial No. 674,815.

*To all whom it may concern:*

Be it known that I, HAROLD E. STURTEVANT, a citizen of the United States, residing at Hartford, in the county of Hartford and State of Connecticut, have invented certain new and useful Improvements in Chains and Parts Therefor, of which the following is a specification.

My invention relates to link chains of the silent type and consists of certain novel parts and combinations of parts which render the chain more efficient, durable and noiseless in operation, which parts and combinations will be specifically described herein and pointed out in the appended claims.

Figure 1:
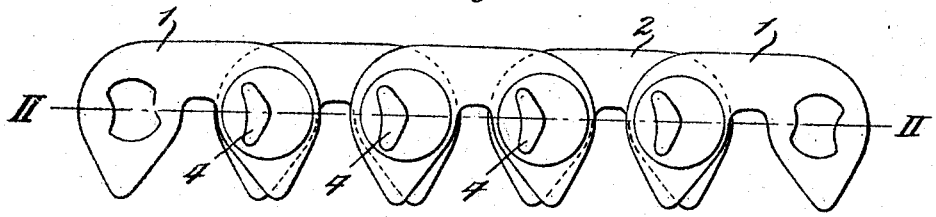
Figure 2:
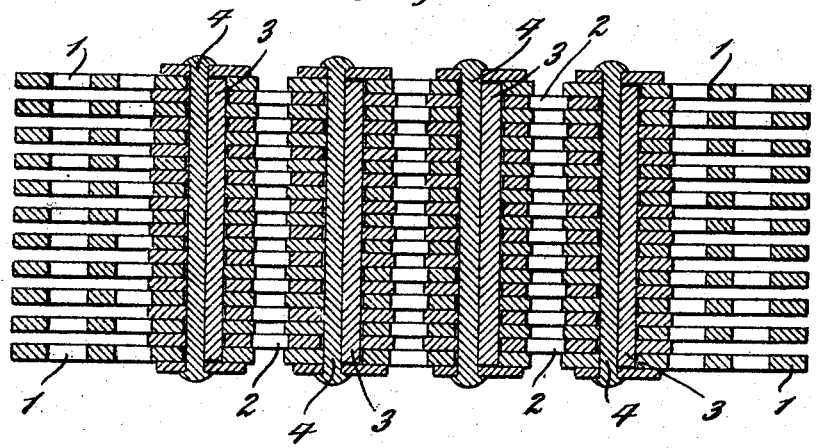
Figure 3:
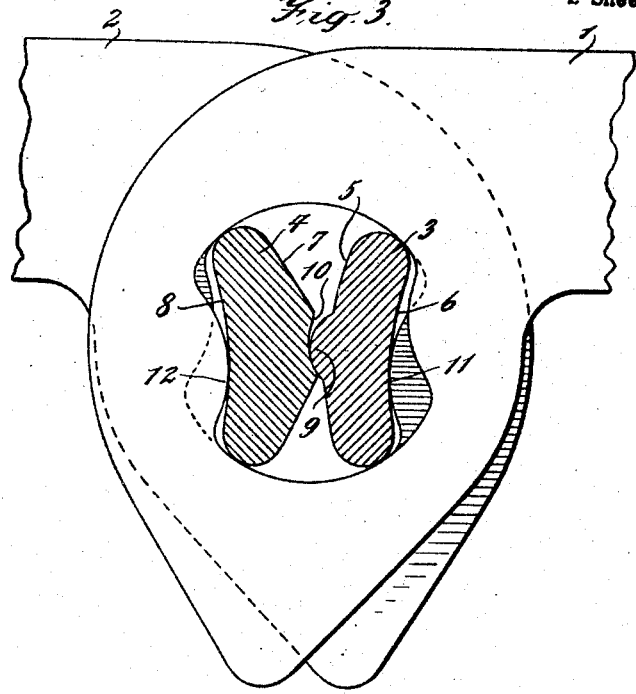
Figure 4:
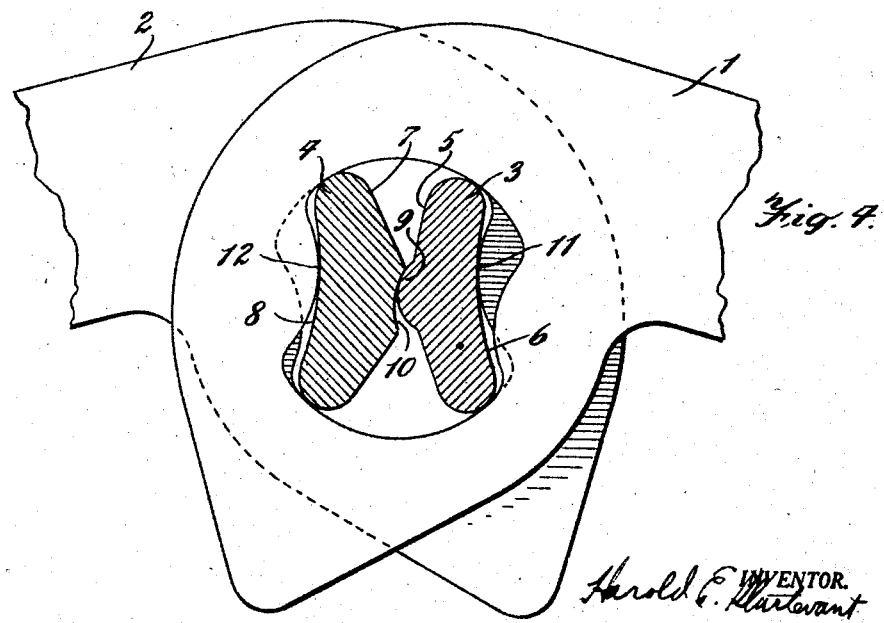

My invention will be better understood by reading the following description taken in connection with the drawings forming a part thereof, which illustrates one embodiment of my invention and, in which, Fig. 1 is a side view of a chain containing one embodiment of my invention; Fig. 2 is an inverted sectional plan view taken along the plane of the line II—II of Fig. 1; Fig. 3 is a sectional elevation on a scale larger than the preceding figures illustrating the positions assumed by the links of adjacent pitches and the pin passing through the openings therein on a straight run of the chain and Fig. 4 is a view similar to Fig. 3 illustrating the joint between the two pitches in the flexed position.

Like characters indicate like parts throughout the drawings.

The chain comprises a series of links 1 of the general form heretofore used in chains of this type, and a series of links 2, arranged side by side and overlapping the links 1. Each link is provided at its ends with openings which register with corresponding openings in the overlapping links. The pin for holding the overlapping links together comprises two members 3 and 4. The member 3 is convex on its side 5 and concave on its side 6. Likewise, the member 4 is convex on its side 7 and concave on its side 8. The convex sides 5 and 7 of the pins 3 and 4 respectively, are placed adjacent each other. The member 3 on its side 5 is provided with a portion 9 taking a greater convexity than the side 5. The side 7 of the member 4 is provided with a concave portion 10 with which the convex portion 9 engages. The concave portion 10 is preferably cylindrical as is also the convex portion 9, but the radius of the cylinder of which the portion 10 is a part, is substantially greater than the radius of the cylinder of which the portion 9 is a part, so that the parts are free to roll upon each other as the links 1 and 2 are flexed relative to each other.

A portion 11 of the link 2 engages the concave side 6 of the member 3 and a similar portion 12 of the links 1 engages the concave surfaces of the member 4. The members 3 and 4 are held in the positions shown in Fig. 4 by the engagement of the upper edges of these members against the top of the openings through the links.

From the foregoing, it will be evident that the joint construction shown has two rolling contacts, one of which is between the portions 9 and 10 and the other of which is between the links of adjacent pitches and the concave sides of the members 3 and 4. By this construction, the friction is reduced to a minimum, and wear is also greatly reduced, whereby the increase in the length of the chain, due to use, is eliminated to a large extent.

Many changes may be made in the details of parts without departing from the spirit of my invention.

I claim:

1. In a chain of the link type, a pin comprising two members each having concave and convex surfaces and placed with their convex surfaces adjacent each other, rounded projections on the chain links engaging the concave surfaces of said members, one of said members having a concave portion on its convex side and the other of said members having a convex portion engaging the concave portion of the other, whereby said members are articulated one with the other.

2. In a chain of the link type, a pin joint comprising two members having convex sides placed adjacent each other, one of said members having a concave portion on its convex side and the other member having on its convex side a portion of less convexity than the concavity of the said concave portion, said portion engaging the concave portion of the other member to form the rolling pivotal center of the joint.

3. In a chain of the link type, a pin joint comprising two members having convex sides placed adjacent each other, one of said members having a concave portion on its convex side and the other member having on its convex side a portion of greater convexity, said portion engaging the concave portion of the other member to form the pivotal center of the joint, said members having concave rear portions and convex portions of the links engaging the concave sides of said members and forming rolling contacts therewith.

HAROLD E. STURTEVANT.